Feb. 25, 1969   A. SCHOEPE ET AL   3,429,333
BALL COCK
Filed June 23, 1966   Sheet 1 of 4

INVENTORS
ADOLF SCHOEPE,
FREDRIC E. SCHMUCK
BY
MAHONEY & HORNBAKER
ATTORNEYS

Feb. 25, 1969     A. SCHOEPE ET AL     3,429,333
BALL COCK
Filed June 23, 1966
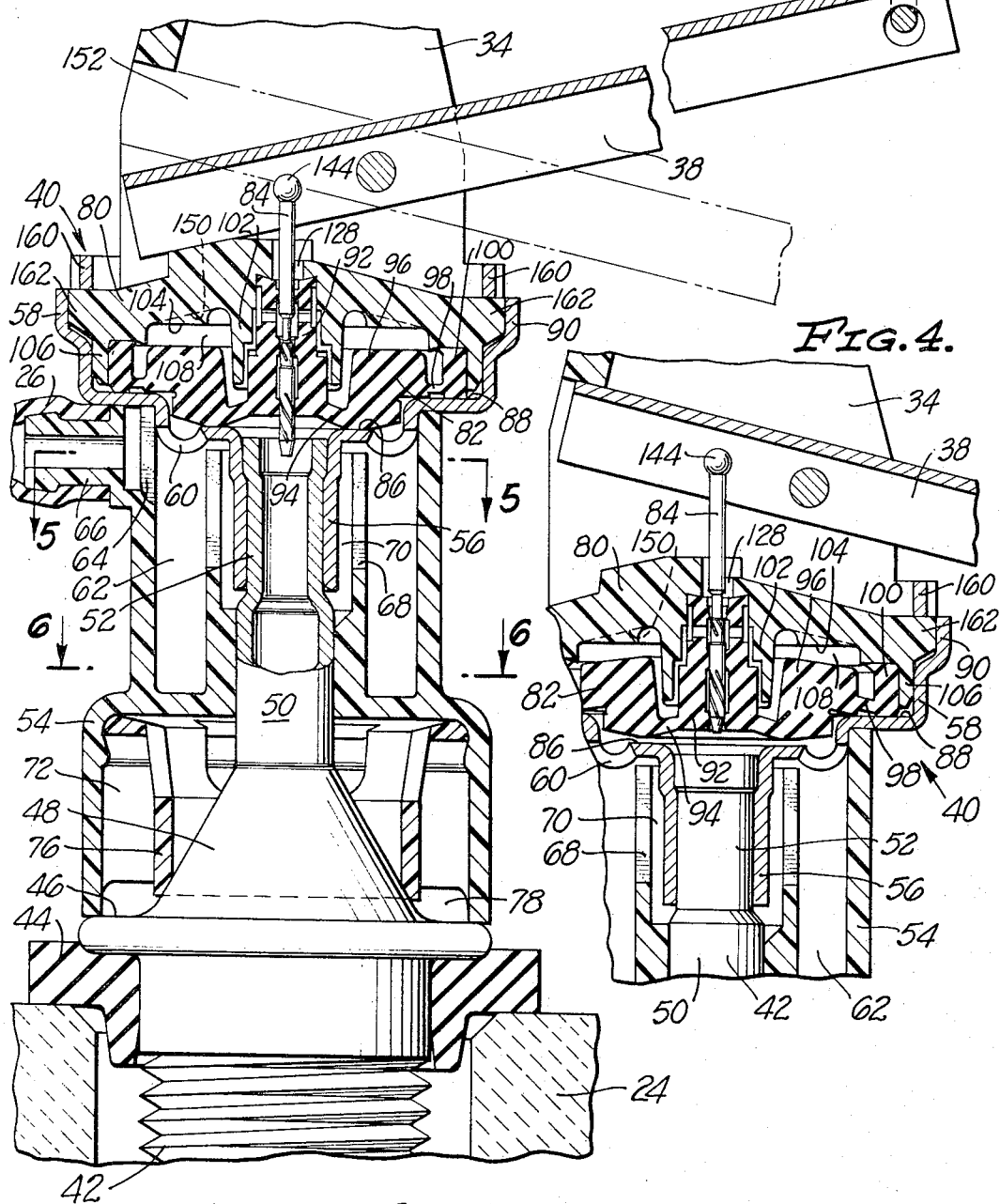
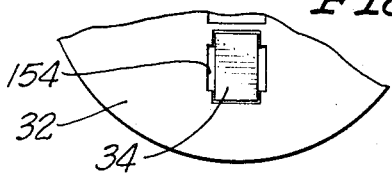
INVENTORS
ADOLF SCHOEPE,
FREDRIC E. SCHMUCK
BY
MAHONEY & HORNBAKER
ATTORNEYS

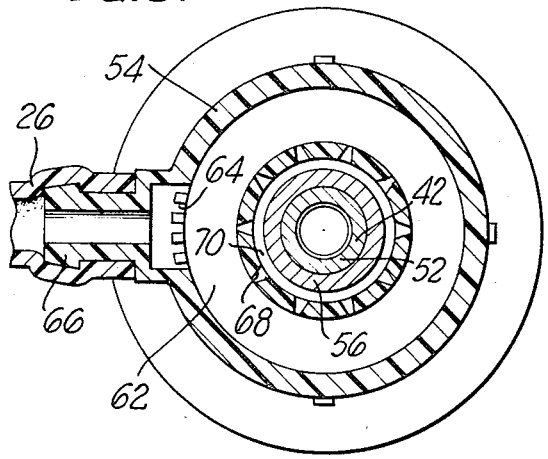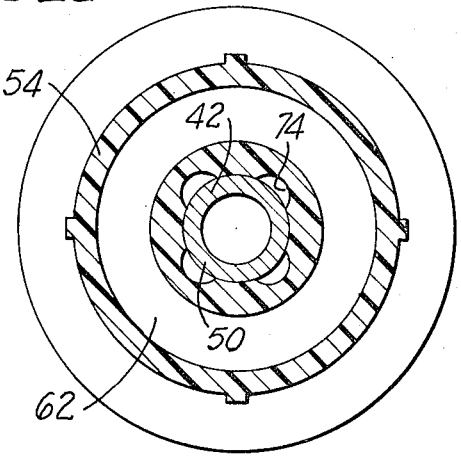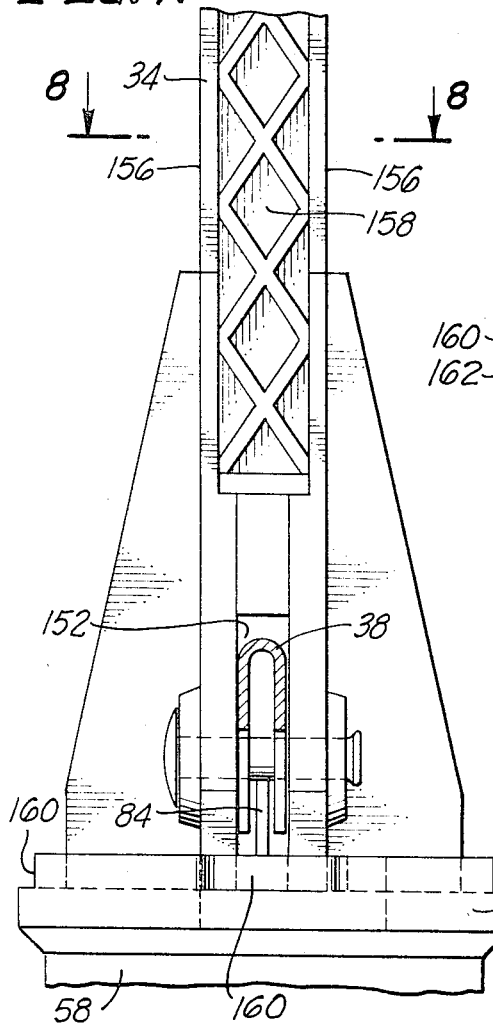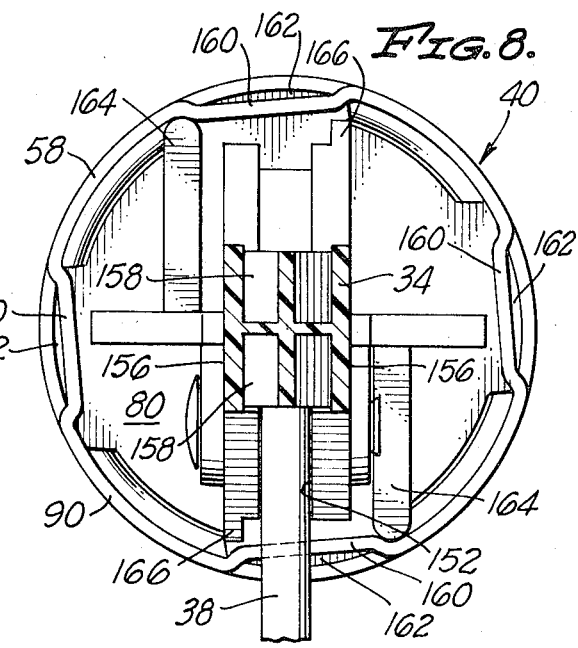

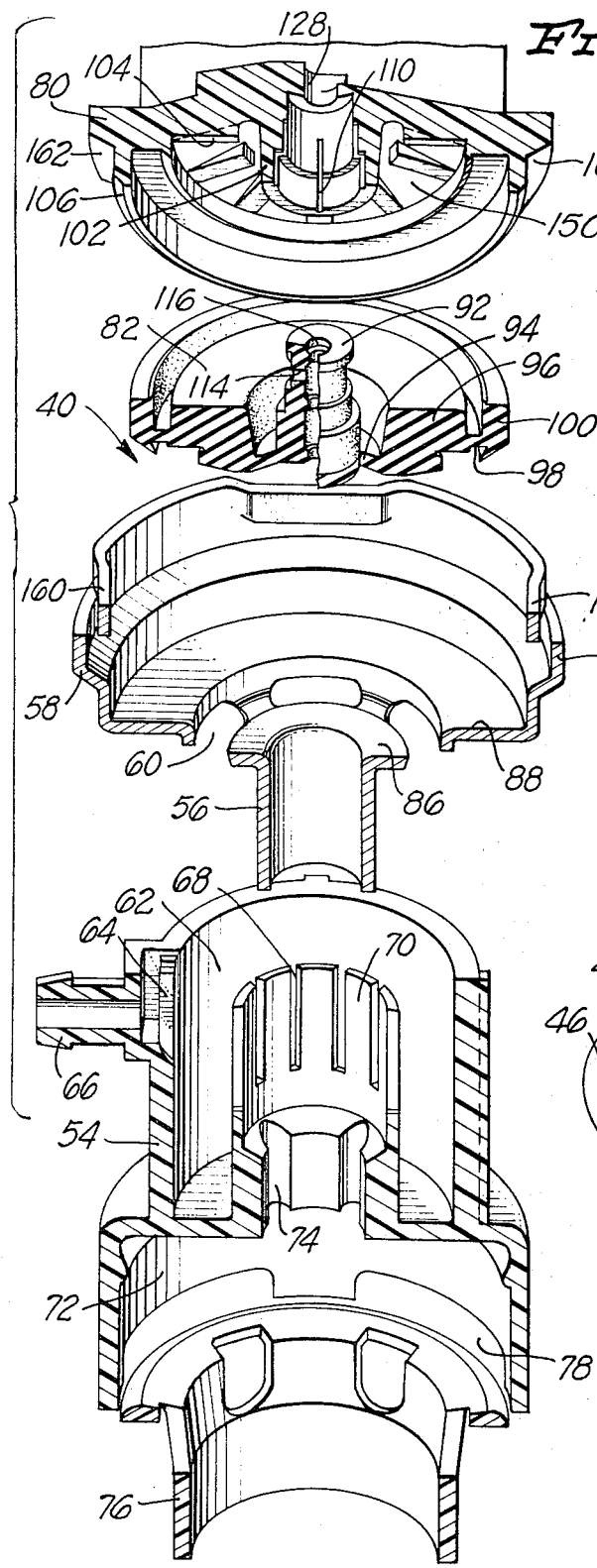
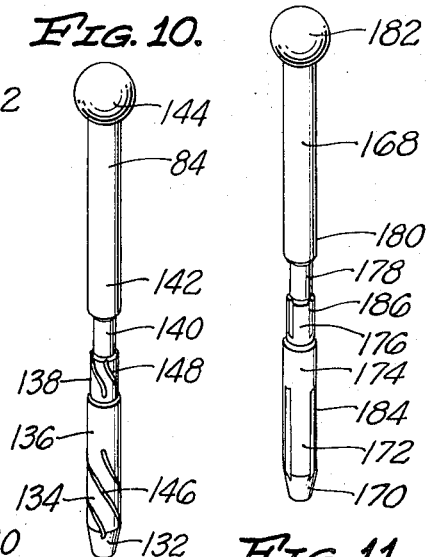
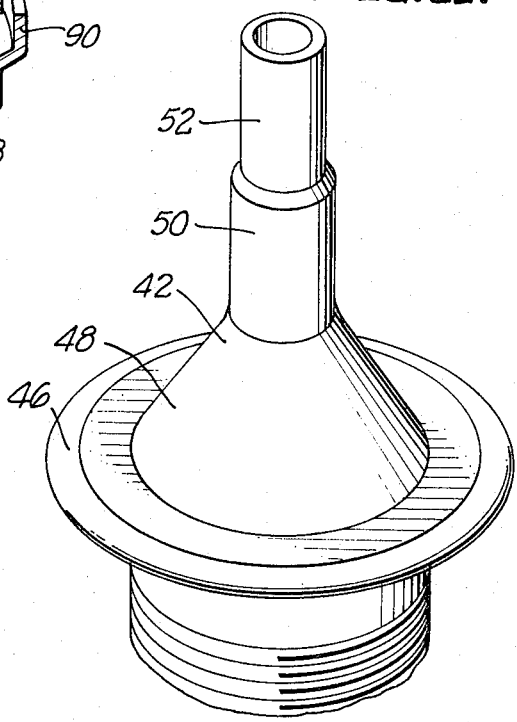
INVENTORS
ADOLF SCHOEPE,
FREDRIC E. SCHMUCK
BY
MAHONEY & HORNBAKER
ATTORNEYS

United States Patent Office 3,429,333
Patented Feb. 25, 1969

3,429,333
BALL COCK
Adolf Schoepe, 1620 N. Raymond Ave., Fullerton, Calif. 92631, and Fredric E. Schmuck, 535 Century Drive, Anaheim, Calif. 92805
Filed June 23, 1966, Ser. No. 559,779
U.S. Cl. 137—315                                23 Claims
Int. Cl. E03d 1/32, 1/33, 1/36

ABSTRACT OF THE DISCLOSURE

An upright plastic beam of polygonal cross section is integral with a plastic upper portion of a valve housing and vertically slidably receives a plastic float by extension through a float slot, said beam and float slot cross sections conforming to prevent relative horizontal rotation therebetween. A lower portion of the valve housing vertically receives the upper portion therein enclosing a resilient valve seal peripherally and centrally engaged by the upper portion and movable toward and away from a lower portion angular valve seat controlling fluid flow through the valve as determined by connection to and vertical movement of the float. The housing upper and lower portions are engaged and disengaged merely through relative horizontal rotation by slidable interengageable means. The beam has latticed vertical grooves therein resisting vertical bending and horizontal twisting.

---

This invention relates to ball cocks for controlling the flow of water in toilet flush tanks and, more particularly, to ball cocks for such use having a unique form of valve construction which is relatively simple, yet of extremely positive operation. Even more particularly, this invention relates to ball cocks for such use wherein the valves are easily accessible and separable for maintenance purposes, and even where the ball cocks are of the siphon type with the valves submerged at the bottom of the toilet flush tank and beneath the water level therein.

One of the major problems with ball cocks for use in toilet flush tanks, and particularly where the ball cocks are of the siphon type in which the opening valves thereof are submerged beneath water virtually at all times, is one of corrosion as a result of such submersion. These ball cocks must be maintained positively operable automatically at all times and over a long period of use and this is extremely difficult when it is considered that the water supplies from area to area will vary greatly as to the various minerals and salts contained therein, as well as the natural tendency of water to attack most materials through the usual oxidation.

A still further problem is occasioned by the fact that water carrying the usual natural materials subjected to varying temperatures, erratic flow conditions and circuitous flow through restricted openings such as is encountered in the flow through toilet flush tanks and the ball cock valves thereof controlling this flow, results in a constant giving up and depositing of these various salts and minerals on the surfaces which this water contacts. This is particularly critical in the necessarily restricted passages of the ball cock valves, the water flow through such passages necessarily having to be controlled for operation of the valve to permit automatic filling of the flush tank.

Also, in order to properly function automatically over a long period of time and subject to the constant water conditions discussed, most prior ball cock valves have been of a relatively complicated nature and it has been extremely difficult to service these valves. In most instances, in order to provide the valves with proper sealing and positively operable over a long period of time under these difficult conditions, the valves have been assembled so as not to be readily disassembled for servicing and maintenance purposes, but rather when the valves become inoperable or erratic in opertaion, it is necessary to completely replace the valves. Thus, it has been necessary for the average home owner to employ outside help and purchase entire valve assemblies resulting in a relatively high maintenance cost.

Still a further problem encountered with ball cocks for controlling the flow of water in toilet flush tanks is occasioned by the fact that these toilet flush tanks are necessarily installed directly in the living quarters so that the noise of water flow therethrough can be extremely irritating if of an excessive nature. This noise problem can be of a frustrating nature in view of the fact that if the water pressure is reduced so that the noise of water flow is minimal, the previously discussed corrosion and mineral and salt depositing problems increase, since the water is not flowing with sufficient velocity and pressure so as to maintain the restricted openings and passages clean. On the other hand, if the water pressure is increased in order to reduce these corrosion and depositing problems, the noise of water flow naturally increases.

It is, therefore, an object of our invention to provide a ball cock for controlling the flow of water in a toilet flush tank which is of extremely positive operation with a minimum of water flow noise, yet the major portions thereof may be formed of moulded plastic so as to reduce the problems of corrosion. This is accomplished by providing a new and unique form of positively operable valve with parts of the valve, as well as the major portion of the remainder of the ball cock being formed of moulded plastic, such as parts moulded from acetal and parts of linear polyethylene. In view of the fact that the parts are of moulded plastic, the various water passages therethrough may be formed with the necessary complicated and circuitous passages so as to minimize the noise from water flow through the valve and into the toilet flush tank.

It is a further object of our invention to provide a ball cock for controlling the flow of water through a toilet flush tank in which the various parts thereof through which the water flow is maintained and controlled are easily and simply accessible to the average, inexperienced home owner for clean out and maintenance purposes. The valve is formed extremely simple and virtually foolproof from the standpoint of inexperienced disassembly and reassembly, and the valve housing is provided with a quick disconnect arrangement so that merely by rotating one-half of the valve housing relative to the other, the internal components of the valve are immediately, completely exposed. Furthermore, in this quick disconnect of the valve housing, the lower portion of the valve housing with the major water flow components remains secured to the water inlet pipe for the flush tank so that once the upper portion of the valve housing has been removed, water can be directed under pressure through the lower portion of the valve and the various deposits and debris therein will be quickly loosened and removed.

It is another object of our invention to provide a ball cock for controlling the flow of water through a toilet flush tank in which the ball cock may be of the siphon type wherein the valve is positioned at the lower portion of the flush tank and beneath the water level, yet by providing the foregoing quick disconnect feature of the valve housing, the various parts of the valve are still readily accessible for clean out and maintenance purposes. The upper portion of the valve housing is formed at the lower end of an upstanding mast or pylon which mast serves as the guide for the float controlling operation of the valve and this float, although vertically movable on the guide, is nonrotatable relative thereto. Thus, the valve housing is easily disconnected and separated merely by grasping the float in the top portion of the flush tank and rotating this float in the proper direction so as to rotate the guide and, therefore, rotate the housing upper portion for the disconnection action. The valve is formed such that certain parts remain with the housing upper portion and the remainder with the housing lower portion, and there are no valve parts which can become easily disconnected and scatter into the lower portion of the flush tank.

It is also an object of our invention to provide a ball cock for controlling the flow of water through a toilet flush tank in which the valve is of a unique nature so as to be positively operable, yet is of extremely simple construction augmenting the foregoing disconnect and clean out features. This valve may be formed with merely four basic parts made up of the housing upper and lower portions, a resilient material sealing member and an actuating pin acting as a control pin for a unique pilot valve which in turn controls the operation of the valve. When the housing upper portion is disconnected from the lower portion thereof by the rotation of the float and upright guide, the resilient sealing member and the actuating pin remain assembled with this housing upper portion and are automatically removed therewith, whereas the housing lower portion is mounted on the water inlet pipe and contains the major portion of the water passages therebeneath so as to provide easy accessibility for flushing purposes as previously described. Also, the major portion of these water flow parts beneath the housing lower portion may be moulded from plastic as previously described so as to provide the complicated barrier and water straining means and maintain the major portion of the deposits and debris in this part of the ball cock so that the flushing will remove the same, and at the same time, in view of the normal muffling qualities of plastic, the problem of noise from the water flow is maintained at a minimum.

It is another object of our invention to provide a ball cock for controlling the flow of water through a toilet flush tank having the foregoing quick disconnect feature for clean out and maintenance of the operating valve thereof, yet when the housing portions are reassembled for reassembling the valve, the valve housing is automatically sealed so as to maintain proper water flow through the valve and permit such water flow to be properly controlled by the valve. The previously described resilient sealing member contained within the valve not only serves as one of the major components for controlling the water flow through the valve and into the flush tank during the operation of the valve, but also is uniquely formed so as to have special sealing flanges at proper locations which are compressible between the housing portions when the valve is assembled by properly connecting the housing portions. These sealing flanges prevent water from flowing from between the housing portions and at other locations, so that the water flow through the housing is only as intended and at locations for proper control by operation of the valve.

Other objects and advantages of the invention will be apparent from the following specification and the accompanying drawings which are for the purpose of illustration only, and in which:

FIG. 2 is an enlarged, fragmentary, vertical, sectional view showing the water inlet portion of the flush tank and the lower valve portion of the ball cock of FIG. 1 with the valve in closed position;

FIG. 4 is a fragmentary, vertical, sectional view similar to FIG. 2, but showing the valve in open position;

FIG. 5 is a horizontal, sectional view taken along the broken line 5—5 in FIG. 2;

FIG. 6 is a horizontal, sectional view taken along the broken line 6—6 in FIG. 2;

FIG. 7 is an enlarged, fragmentary, side elevation, part in section, taken along the broken line 7—7 in FIG. 1;

FIG. 8 is a fragmentary, horizontal, sectional view taken along the broken line 8—8 in FIG. 7;

FIG. 9 is an exploded, vertical, sectional view of the valve and various water flow components;

FIG. 10 is a side perspective view showing the pilot pin of the valve greatly enlarged in order to illustrate the various details thereof;

FIG. 11 is an enlarged, side perspective view of the water inlet member for the valve mounted on the water inlet pipe of the flush tank;

FIG. 12 is a fragmentary, top plan view taken along the broken line 12—12 in FIG. 1 showing the nonrotatable slidable connection between the float and guide; and FIG. 13 is a side perspective view similar to FIG. 10 showing a slightly modified form of the pilot pin for the valve.

Figure 1:
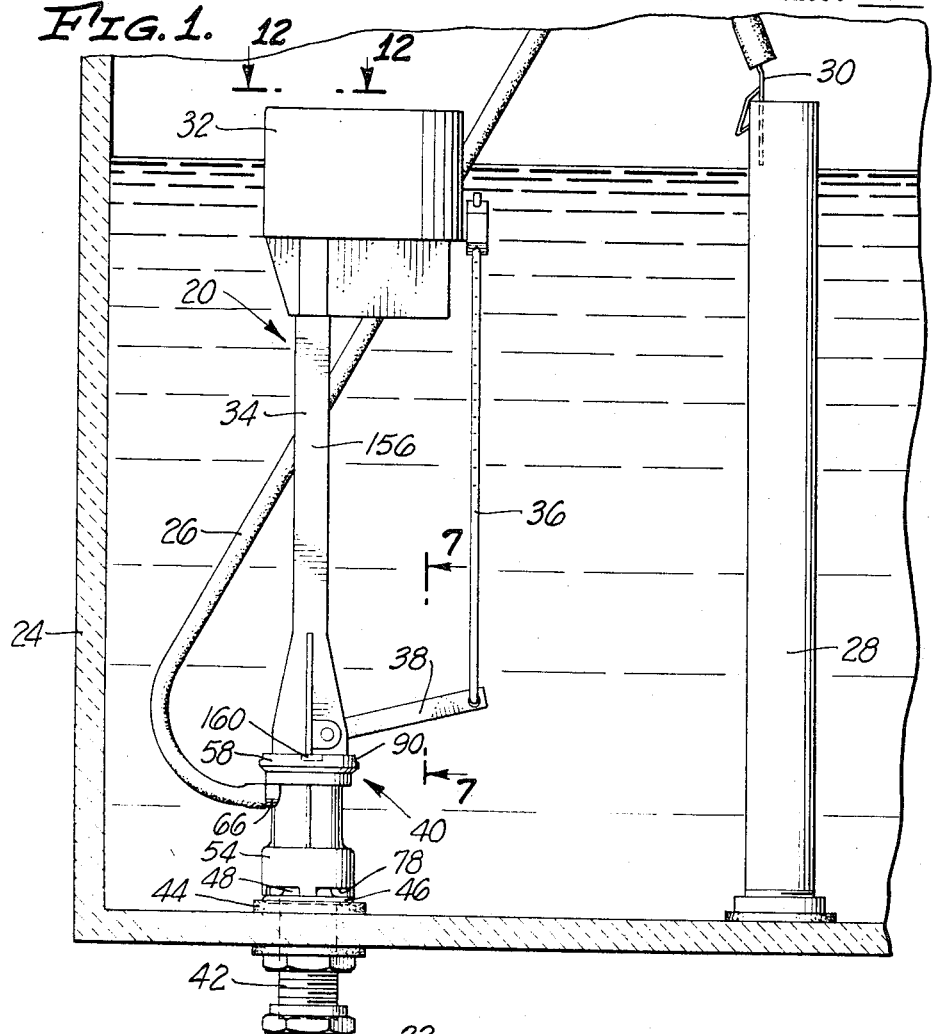
FIG. 1 is a fragmentary, vertical, sectional view of a toilet flush tank having an embodiment of the ball cock of the present invention installed therein and shown in side elevational view.

As shown in FIG. 1, the embodiment of the ball cock generally indicated at 20 is shown threadably secured to the water inlet pipe 22 of a toilet flush tank 24, with the exterior end of the ball cock refill hose 26 secured to the upper extremity of the overflow tube 28 by a unique mounting clip 30 for directing refill water into the overflow tube. Also, the ball cock 20 is shown therein as including a unique form of float 32 nonrotatably and vertically, slidably mounted on an upright ball cock guide 34 having the form of a beam-like mast or pylon to be hereinafter described in detail, and with the float being operably connected through a connecting arm 36 to a valve operating lever 38 for operating the valve 40 of the present invention. As stated, the mounting clip 30 for the extremity of the refill hose 26, and the float 32 are of unique form, but do not form a part of the present invention other than the particular co-operating relationship of the float with the guide 34 and valve 40, but rather the mounting clip 30 and float 32, as well as the design appearance of the ball cock 20, are described and claimed in our copending applications Ser. No. 559,778 entitled "Refill Hose Mounting Clip," now Patent No. 3,319,913 issued May 16, 1967, Ser. No. 559,772 entitled "Ball Cock Float" and Ser. No. D. 2,796 entitled "Design for Ball Cock," now Patent No. Des. 206,850 issued Jan. 31, 1967, all filed on an even date herewith.

With the exception of the fluid inlet member 42, which may be formed of copper, brass or other usual materials, and various components formed of resilient materials and stainless steel, the major portion of the ball cock 20 is formed of moulded plastics. It is preferred to form the float 32 of linear polyethylene and remaining plastic parts of acetal. In this manner, the usual problems with corrosion by the water flowing through the flush tank 24 are almost indefinitely eliminated and the problems of scale deposits greatly minimized. Furthermore, by moulding a major portion of the ball cock 20 from plastics, it is possible to provide intricate and complicated configurations for forming water passages which would not otherwise be possible from unmoulded materials.

Referring particularly to FIGS. 1 through 6, 9 and 11, the ball cock 20 is mounted in the flush tank 24 by the fluid inlet member 42 which extends downwardly through the flush tank overlying the resilient gasket 44 and is threadably secured in communication with the water inlet pipe 22. Fluid inlet member 42, as before stated, is preferably formed of copper or brass and includes the annular radial flange 46, the frusto-conical portion 48, the enlarged, cylindrical portion 50 and the reduced, cylindrical portion 52, with the reduced, cylindrical portion 52 being downwardly telescoped by the inlet neck 56 on the housing lower portion 58 forming a part of the valve 40. As can be seen by comparison of FIGS. 2 and 11, FIG. 11 shows the fluid inlet member 42 prior to assembly, and after pressing of the reduced, cylindrical portion 52 into the inlet neck 56 of the valve housing lower portion 58, this reduced, cylindrical portion 52 is formed outwardly so as to retain this portion and the inlet neck in permanent assembly, and in this manner, the fluid inlet member serves to support valve 40 in such assembly.

The plastic fluid outlet member 54 is also telescoped over the fluid inlet member 42, with the upper end of this outlet member abutting the valve housing lower portion 58 outwardly of the fluid outlet openings 60 of this housing lower portion. The lower end of the fluid outlet member 54 rests on the radial flange 46 of fluid inlet member 42, with this outlet member forming the upper, outer, annular chamber 62 communicating outwardly through the slots 64 with the refill hose connector 66 and inwardly through the slots 68 with the upper, annular, inner chamber 70 which surrounds the previously described reduced cylindrical portion 52 and inlet neck 56. As can be seen in FIG. 6, this upper, inner chamber 70 communicates downwardly with a lower outlet chamber 72 through the axially extending slots 74 surrounding the enlarged, cylindrical portion 50 of fluid inlet member 42 with this lower outlet chamber 72 enclosing the slotted baffle member 76 and communicating outwardly into the flush tank 24 through the elongated outlet openings 78 overlying the inlet member flange 46.

Valve 40 is formed by the previously alluded to preferably stainless steel housing lower portion 58, the plastic housing upper portion 80, the resilient material sealing member 82 and the preferably stainless steel pilot valve actuating pin 84, so that this valve is formed of merely four basic parts. The housing lower portion 58 is formed with a flat, annular valve seat 86 between the inlet neck 56 and fluid outlet openings 60, so that this valve seat is positioned internally of the housing lower portion between the fluid inlet and outlet means for this lower portion. Outwardly of the fluid outlet opening 60, the housing lower portion 58 is formed with a flat, annular sealing surface 88 terminating outwardly in a contoured, axially extending flange 90, thereby forming this housing lower portion generally cup-shaped and opening upwardly, with the valve seat 86 internally and at a lower portion thereof.

Thus, as best seen in FIGS. 1 and 2, a main fluid passage is provided for the ball cock 20 from the water inlet pipe 22 upwardly through the fluid inlet member 42 into the valve housing lower portion 58 through the inlet neck 56. This fluid passage then extends outwardly within the valve housing lower portion 58 over the valve seat 86 and downwardly through the valve fluid outlet openings 60 into the fluid outlet member 54. Within the fluid outlet member 54, the fluid passage communicates outwardly through the refill hose connector 66, with the refill hose 26, but primarily extends downwardly in a circuitous path around the fluid inlet member 42 and ultimately opens outwardly into the flush tank 24 through the lower outlet opening 78 of this fluid outlet member.

It will be noted that the flow of water in this fluid passage within the fluid outlet member 54 is not only required to follow a circuitous path, but is also required to flow through and around a series of slots and baffles so that not only will the noise of water flow be minimized, but detritus and any other foreign materials and debris of a solid form within the water will be given up within the fluid outlet member. Also, the provision of the slotted opening through slot 64 into the refill hose connector 66 will produce this same action. In this manner, the major portion of such materials are retained within the fluid outlet member 54 for convenient flushing therefrom, as will be hereinafter described in detail, and permitted by the unique construction of the ball cock 20 of the present invention and particularly the unique construction of the valve 40 thereof.

The resilient material sealing member 82 of the valve 40 controls the flow of water through the fluid passage just described and is a unitary member including the thickened, cylindrical, central stationary portion 92 connected outwardly through the relatively thin, annular, flexible connecting portion 94 to the thickened, annular, movable sealing portion 96. The movable sealing portion 96 is in turn outwardly connected by the relatively thin, annular, flexible connecting portion 98 to the thickened, outer or parametrical, annular, stationary sealing portion 100. Thus, sealing member 82 is a diaphragm-type of sealing member, with the movable sealing portion 96 being axially movable relative to the central stationary portion 92 and stationary outer sealing portion 100.

Figure 3:
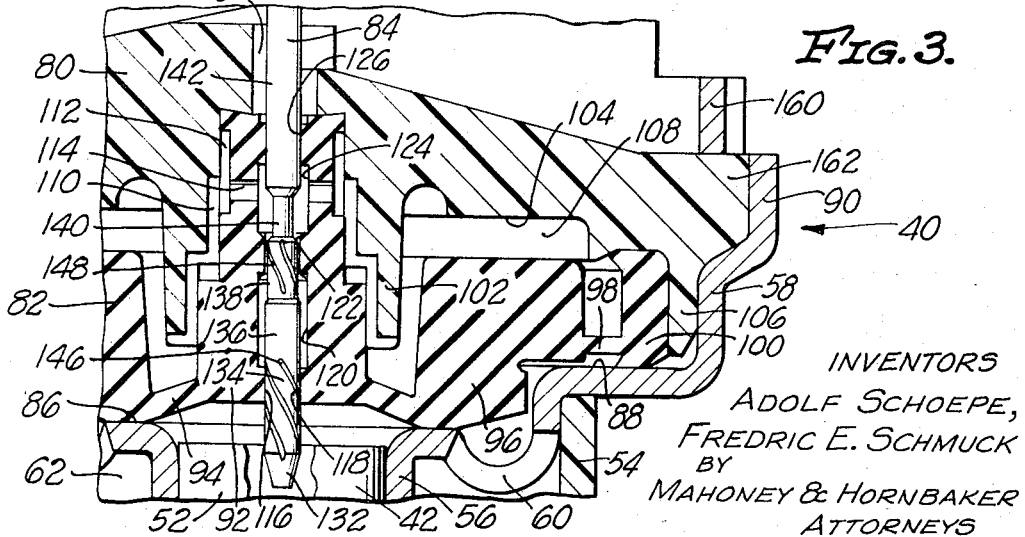
FIG. 3 is a still further enlarged, vertical, sectional view taken from FIG. 2 and more clearly showing the internal details of the valve components.

The sealing member 82 is received upwardly within the cupped contour of the plastic valve housing upper portion 80, with the sealing member central stationary portion 92 substantially telescoped by and abutting the downwardly extending, annular, stepped positioning neck 102, the sealing member flexible connecting portion 94 spaced downwardly from the lower extremities of this neck, the sealing member movable sealing portion 96 spaced outwardly of this neck and downwardly from the radially extending, internal pressure surface 104, the flexible connection portion 98 spaced downwardly from this pressure surface 104, and the stationary outer sealing portion 100 abuting this pressure surface 104 and outwardly telescoped by and abutting the downwardly extending, annular positioning flange 106. As best seen in FIGS. 2, 3 and 4, this positioning and contour of the sealing member 82 within the valve housing upper portion 80, and the particular internal contour of this valve housing upper portion forms a somewhat inverted U-shaped cross section, annular, pressure sealing chamber 108 between the sealing member movable sealing portion 96 and the internal pressure surface 104 of the valve housing upper portion 80 defined inwardly by the stepped positioning neck 102 of the housing upper portion and outwardly by the stationary outer sealing portion 100 of the sealing member. Furthermore, a series of circumferentially spaced slots 110 in the internal surface of the stepped positioning neck 102 of the valve housing upper portion 80 form a fluid communication between this pressure sealing chamber 108 inwardly through the annular distribution chamber 112 and diametrical openings 114 of sealing member 82 into the central, axially extending, through pilot valve opening 116 of this sealing member.

As best seen enlarged in FIG. 3, the sealing member pilot valve opening 116 extending axially and centrally through the sealing member central stationary portion 92 is formed from the lower end of this central stationary portion by the reduced inlet portion 118, the enlarged bypass portion 120, the reduced bypass portion 122, the enlarged distribution portion 124 and the reduced exhaust portion 126 opening upwardly of the sealing member and upwardly through the central, axially extending, exhaust opening 128 of the valve housing upper portion 80. As is also shown enlarged in FIG. 3 and in FIG. 10 removed from the sealing member 82, the pilot valve pin 84, forming the other half of the pilot valve within the sealing member, is formed from the lower end of this pin with the tapered lower end 132, the enlarged bypass portion 134, the enlarged lower sealing portion 136, the minor reduced bypass portion 138, the major reduced distribution portion 140, and the enlarged upper sealing portion 142 which extends upwardly through the previously described central exhaust opening 128 in the housing upper portion 80, with the upper end of this pin being formed with the spherical connector 144. Both the pilot valve opening 116 in the sealing member central stationary portion 92 and the pilot valve pin 84 are formed cylindrical and dimensioned such that the reduced portions of the pilot valve opening will relatively tightly abut the enlarged portions of the pilot valve pin when any of these pin enlarged portions are moved axially into any of these opening reduced portions, and a series of circumferentially spaced, axially extending, spiral bypass grooves 146 and 148 are formed respectively in the pin enlarged bypass portion 134 and minor reduced bypass portion 138 for the passage of water therethrough while restricting the passage of detritus or other materials.

With the pilot valve pin 84 in its downward valve closing position, as shown in FIGS. 2 and 3, the pin tapered lower end 132 projects downwardly spaced below the opening reduced inlet portion 118, pin enlarged bypass portion 134 is within the opening reduced inlet portion 118, the pin enlarged lower sealing portion 136 is within the opening enlarged bypass portion 120, the pin minor rdeuced bypass portion 138 is within the opening reduced bypass portion 122, the pin major reduced distribution portion 140 is within the opening enlarged distribution portion 124 and the pin enlarged upper sealing portion 142 is within the opening reduced exhaust portion 126. Fluid may therefore flow from downwardly of the sealing member central stationary portion 92 upwardly through the pilot valve opening 116 into the pressure sealing chamber 108 between the sealing member movable sealing portion 96 urging this movable sealing portion downwardly, while the pin enlarged upper sealing portion 142 is sealed against the opening reduced exhaust portion 126. It will also be noted that the upward abutment of the sealing member central stationary portion 92 against the valve housing upper portion 80 will provide a fluid seal at this point, as will the upward and outward abutment of the sealing member stationary outer sealing portion 100 against the housing upper portion and the positioning flange 106 thereof.

In the upward valve open position of pilot valve pin 84, as shown in FIG. 4, the pin tapered lower end 132 has been moved partially into the opening reduced inlet portion 118, the enlarged by-pass portion 134 is partially in the opening reduced inlet portion 118 and partially in the opening enlarged bypass portion 120, the pin enlarged lower sealing portion 136 is in and sealing the opening reduced bypass portion 122, the pin minor reduced bypass portion 138 is within the opening enlarged distribution portion 124, the pin major reduced distribution portion 140 is within and extending through the opening reduced exhaust portion 126 and the pin enlarged upper sealing portion 142 is spaced above the upper end of the sealing member central stationary portion 92. In this position, fluid is prevented from communicating upwardly from beneath the sealing member central portion 92 through the pilot valve opening 116 by the seal formed by the pin enlarged lower sealing portion 136 and opening reduced bypass portion 122, thereby preventing the flow of water into the pressure sealing chamber 108, while at the same time permitting the exhaust of water from this pressure sealing chamber through the opening reduced exhaust portion 126 upwardly through the central exhaust opening 128 of the valve housing upper portion 80. In this position of the pilot valve pin 84, therefore, the sealing member movable sealing portion 96 is permitted to move upwardly forcing the water from the pressure sealing chamber 108, and it will be noted that a series of spaced, radially extending grooves 150 are formed in the internal pressure surface 104 of the valve housing upper portion 80 assuring that in the event the sealing member movable sealing portion 96 should move against this internal pressure surface, the pressure sealing chamber 108 can never be completely sealed off, but rather can always be entered by fluid through these grooves.

With the housing upper portion 80 carrying the resilient material sealing member 82 and pilot valve actuating pin 84 inserted downwardly in the housing lower portion 58, detachably secured thereto in a manner to be hereinafter described, the downwardly tapered edge of the sealing member stationary outer sealing portion 100 will be compressed against the sealing surface 88 of the housing lower portion 58 and the upwardly tapered end of this stationary outer sealing portion will be compressed against the housing upper portion 80 so as to form an outer parametrical seal preventing the passage of fluid outwardly between the housing upper and lower portions. Furthermore, as shown in FIGS. 2 and 3, with the pilot valve pin 84 in downward or valve closing position, water flowing upwardly through the fluid inlet member 42 centrally against the sealing member 82 will pass upwardly through the pilot valve opening 116 into the pressure sealing chamber 108 between the sealing member and the housing upper portion 80 so as to force the sealing member movable sealing portion 96 downwardly against the valve seat 86 on the housing lower portion 58 thereby sealing off the flow of water between the fluid inlet member 42 and the fluid outlet openings 60 of the housing lower portion. This, therefore, prevents the flow of water through the valve 40 into the flush tank 24, as well as into the refill hose 26.

When the pilot valve pin 84 is moved upwardly to its upward or valve opening position, as shown in FIG. 4, the flow of water upwardly through the sealing member pilot valve opening 116 is sealed off and prevented, while at the same time, the exhaust of water from the pressure sealing chamber 108 upwardly through the sealing member pilot valve opening, and upwardly through the central exhaust opening 128 of the housing upper portion 80 is permitted. Thus, the upward pressure of the water against the sealing member 82 will force the exhaust of water from the pressure sealing chamber 108 by an upward forcing of the sealing member movable sealing portion 96 upwardly toward the housing upper portion 80. This will force the sealing member movable sealing portion 96 to move upwardly away from the valve seat 86 on the housing lower portion 58 and provide fluid communication from the fluid inlet member 42 between the sealing member movable sealing portion 96 and valve seat 86 and outwardly and downwardly through the fluid outlet openings 60 of the housing lower portion, outwardly through the refill hose connector 66 into the refill hose 26, and downwardly through the fluid outlet member 54 into the flush tank 24.

A valve 40 is therefore provided which is of relatively simple construction yet is highly efficient for performing the necessary function of controlling the flow of water into the flush tank 24. The only movable portions of this valve are the movable sealing portion 96 of the resilient material sealing member 82 and the pilot valve pin 84, while the central stationary portion 92 of this sealing member, as well as the stationary outer sealing portion 100 thereof, remains stationary at all times with the valve housing upper portion 80. Furthermore, the fact that the sealing member central stationary portion 92 remains stationary at all times assures that the movable positioning of the pilot valve pin 84 will always be exactly proper and assure positive action in both the open and closed positions of the valve 40.

Since the pressure sealing chamber 108 controlling the action of this valve 40 is formed between the sealing member movable sealing portion 96 and the internal pressure surface 104 of the housing upper portion 80, no closed chambers are required to be formed within this resilient material sealing member 82 so that the problems of fabrication and assembly in the valve 40 are minimized. Also, a highly efficient pressure sealing chamber 108 is provided for movement of the sealing member movable sealing portion 96 by the formation of this pressure sealing chamber of inverted U-shaped contour, as shown and described. Not only is the sealing member movable sealing portion 96 forced directly downwardly against the valve seat 86 by the water pressure within this pressure sealing chamber 108, but also by virtue of this inverted U-shaped contour, forces are exerted at the sides of the sections of the movable sealing portion so as to provide a secure engagement between this movable sealing portion and the valve seat. Additionally, as can be clearly seen in FIGS. 2 and 3, when the sealing member movable sealing portion 96 is in its down position tightly abutting the valve seat 86, outer parts of this movable sealing portion overlie the sealing surface 88 of the housing lower portion 58, thereby preventing any possibility of this movable sealing portion being extruded downwardly into the fluid outlet openings 60 of this housing lower portion.

As also can be clearly seen in FIGS. 2 and 3, when the pilot valve pin 84 is in its downward position for permitting the flow of water into the pressure sealing chamber 108 and causing the valve 40 to close, the enlarged bypass portion 134 of this pin is guided in the reduced inlet portion 118 of the sealing member central stationary portion 92 so that the flow of water upwardly around the pin is required to pass through the spiral bypass grooves 146. Thus, although this pin enlarged bypass portion 134 never seals in the reduced inlet portion 118 of this sealing member opening, and cannot if the proper flow of water is to be maintained upwardly into the pressure sealing chamber 108 for closing the valve 40, the requirement that the water must pass through these spiral grooves 146 assures that solid materials cannot pass into the inner portions of this pilot valve so as to disturb the proper working thereof.

Also, as shown in FIG. 4 and equally important, is the fact that when the pilot valve pin 84 is moved to its upward position for permitting the flow of water from the pressure sealing chamber 108 and causing the valve 40 to open, the enlarged bypass portion 134 of the pin still remains partially in the reduced inlet portion 118 of the sealing member central stationary portion 92 still guarding against the entrance of solid materials into the pilot valve which could disturb the functioning thereof. It is evident, therefore, that the enlarged bypass portion 134 of the pilot valve pin 84 never leaves the entrance into the restricted inner confines of the valve 40 formed by the reduced inlet portion 118 of the sealing member central stationary portion 92 despite the valve closing or opening position of the pin, so that a guard is always maintained against the entrance of solid materials and the proper functioning of the valve is insured.

As previously stated, the valve housing upper portion 80 is formed of plastic and is integral with the lower end of the guide 34, and overlying the housing lower portion, the guide is broadened and formed with the diametrical slot 152 therethrough, as shown in FIG. 7. The inner end of the inverted U-shaped cross section, valve operating lever 38 is received within this guide slot 152 and pivotally connected to the guide 34 with the spherical connector 144 at the upper end of the pilot valve pin 84 being pivotally secured within the inner end of this valve operating lever spaced inwardly from the point of pivotal connection of this valve operating lever to the guide, as shown in FIG. 2. Thus, upward pivoting of the outer end of valve operating lever 38 will move the inner end thereof downwardly, moving the pilot valve pin 84 downwardly to close valve 40, as previously described, and opposite pivotal movement of the valve operating lever will move the pilot valve pin upwardly to open the valve.

The outer end of the valve operating lever 38 is pivotally connected to the connecting arm 36, which connecting arm is in turn connected to the float 32 for movement upwardly and downwardly with the float. The construction details of the float 32 are fully set forth in our previously alluded to copending application, Ser. No. 559,772, and for purposes of the present invention, the float may be considered to operate in the conventional manner. Important to the principles of the present invention is the fact that the float 32 is mounted vertically slidable but nonrotatable on the guide 34 through the polygonal, in this case rectangular, cross section slot 154 formed vertically through the float receiving the polygonal, in this case rectangular, cross section guide, as shown in FIG. 12.

Thus, grasping and rotating the float 32 will cause rotation of the guide 34. Furthermore, as best seen in FIGS. 7 and 8, the guide 34 is provided with rotative twisting strength, as well as vertical bending strength, by forming this guide as a latticed-groove structural member. As shown, guide 34 is formed with opposite continuous sides 156 and the remaining opposite sides 158 with latticed grooves formed therein, thereby providing the structural strength required.

As previously mentioned, the valve housing upper portion 80 is detachably secured to the housing lower portion 58 and this is accomplished, as best seen in FIG. 8, by forming circumferentially spaced portions of the housing lower portion flange 90 inwardly so as to form the circumferentially spaced, inwardly projecting, engagement flanges 160 which slidably engage and overlie the circumferentially spaced, outwardly projecting, engagement flanges 162 formed on the housing upper portion. The housing upper portion 80 may therefore be received downwardly within the housing lower portion 58, as previously described, with the upper portion engagement flanges 162 circumferentially adjacent and downward of the lower portion engagement flanges 160, and limited relative rotation between these upper and lower portions will slidably engage the engagement flanges 162 beneath the engagement flanges 160 so as to secure these housing portions assembled and compressing the previously described resilient material sealing member 82 therebetween. Furthermore, the housing upper portion 80 is formed with the stop members 164 positioned for engaging the ends of the engagement flanges 160 on the housing lower portion 58 when the limited rotation for secure engagement between these housing portions is complete, and is also formed with the abutment members 166 radially engaging the engagement flanges 160 during this limited rotation to require positive engagement and disengagement movement and guard against accidental disengagement.

With this unique construction of the valve 40 and the integral connection between the valve housing upper portion 80 and the guide 34, when it is desired to clean the valve of detritus or other foreign material, it is merely necessary to grasp the float 32 and rotate the same in the proper direction, thereby rotating the guide 34 and the housing upper portion so as to disengage this housing upper portion from the housing lower portion 58. Thereafter, merely by lifting the float 32 and guide 34 upwardly carrying the valve housing upper portion 80, the valve resilient material sealing member 82 and the pilot valve pin 84 therewith, will completely expose the valve housing lower portion 58 so that this housing lower portion, along with the fluid inlet member 42 and fluid outlet member 54, may be flushed merely by flowing water therethrough and into the flush tank 24. Cleaning of the remainder of the valve 40, that is, the housing upper portion 80 and the sealing member 82, may be accomplished merely by removing the sealing member from the housing upper portion, with reassembly being accomplished in the reverse manner.

In the overall operation of the ball cock 20, the flushing of the toilet, not shown, will drain the water from the flush tank 24, and as this water level lowers the float 32 will slide downwardly along the guide 34, ultimately opening the valve 40 and admitting water into the flush tank, as well as through the refill hose 26 into the overflow tube 28. As the water level again rises, the float 32 will slide upwardly along the guide 34 and ultimately close the valve 40 so as to stop the flow of water.

A slightly modified form of the pilot valve actuating pin 84 is shown in FIG. 13 and indicated at 168. Pin 168 is constructed substantially the same as the pin 84 previously described for the main part thereof and includes the same tapered lower end 170, enlarged bypass portion 172, enlarged lower sealing portion 174, minor reduced bypass portion 176, major reduced distribution portion 178, enlarged upper sealing portion 180 and spherical connector 182, all of which are positioned and cooperate with the various portions of the sealing member central stationary portion 92 in the same manner as previously described relative to the pin 84. The only differences between pin 168 and the previously described pin 84 are that bypass grooves 184 in the enlarged bypass portion 172 and bypass grooves 186 in the minor reduced bypass portion 176 are substantially straight, axially extending rather than the spiral bypass grooves 146 and 148 of the pin 84, although the bypass grooves 184 and 186 serve the identical function.

Although the ball cock of the present invention has been illustrated and described herein for use in controlling the flow of water in a toilet flush tank, it is evident, from the broader standpoint, that the purpose of the ball cock is for maintaining a liquid reservoir level whether in a toilet flush tank or in some other device, and whether or not the liquid involved is water. For instance, the ball cock according to the principles of the present invention may be advantageously used with swimming pools to control water level, or with range water tanks, or with evaporative condensers, or with cooling towers, in every case for the maintaining of a liquid reservoir level. It should be understood, therefore, that it is not intended to limit the principles of the present invention to ball cocks for toilet flush tanks alone, but rather ball cocks according to the principles of the present invention may be installed for various other purposes and uses, all of which are fully contemplated according to the present invention.

Thus, according to the principles of the present invention, a unique ball cock for controlling the flow of water or other liquids in toilet flush tanks and other devices requiring the maintenance of a liquid reservoir level is provided which has an extremely positive valve 40 for controlling the same and has the various components thereof, including the fluid outlet member 54, formed for proper water flow with a minimum of water flow noise, with the major portion of this ball cock being formed of plastic for reducing the problems of both noise and corrosion. Further, despite the fact that the ball cock 20 may have the valve 40 thereof positioned at the lower portion of the flush tank 24 and below water level, the ball cock is uniquely formed, with the valve housing portions 58 and 80 easily disconnectable by a simple rotation of the float 32 and guide 34 so that the various parts of the valve are fully accessible for clean out or other maintenance requirements, and there are no valve parts which become free during this disconnection so as to be scattered beneath the water at the bottom of the flush tank 24. Also, the reassembly of the ball cock 20 is virtually foolproof due to the simplicity thereof and proper sealing and operation of the valve 40 will be assured despite repeated disassembly and reassembly by persons lacking special knowledge and skill.

We claim:
1. In a ball cock for utilization in maintaining a liquid reservoir level, the combination of: a valve housing having separable upper and lower portions, engagement means normally engaged between said housing portions for selective separation and re-engagement of said housing portions solely upon relative slidable rotation therebetween, said housing portions being free of other engagement means therebetween; valve means in said valve housing for movement between positions preventing and permitting the flow of fluid through said housing, said valve means being accessible upon said separation of said housing portions; an upright guide mounted on one of said housing portions; a float operably connected movable along said guide; and means operably connecting said float and valve means for movement of said valve means between said positions upon movement of said float generally vertically along said guide.

2. A ball cock as defined in claim 1 in which said engagement means normally engaged between said housing portions includes radially projecting engagement members formed on each of said housing portions normally engageably interfitting and separable upon said relative slidable rotation therebetween.

3. A ball cock as defined in claim 1 in which the lower end of said guide is secured to said housing upper portion and against rotation therebetween, said guide coaxially rotating said housing upper portion upon rotation of said guide.

4. A ball cock as defined in claim 1 in which said housing upper portion is formed integral with the lower end of said guide so as to be coaxially rotatable with said guide for said relative rotation of said housing portions.

5. A ball cock as defined in claim 1 in which said guide includes an upright beam rigidly secured to one of said housing portions for nonrotation therebetween; and in which said float is operably connected to said guide beam for generally vertical movement along said guide beam and nonrotation therebetween generally horizontally about said beam and throughout said float vertical movement.

6. A ball cock as defined in claim 1 in which said guide is an upright beam of polygonal cross section rigidly secured to one of said housing portions for nonrotation therebetween; and in which said float is formed with a slot of polygonal cross section generally vertically therethrough receiving said guide beam for vertical movement and nonrotation therebetween generally horizontally about said beam and throughout said float vertical movement.

7. A ball cock as defined in claim 1 in which said guide includes an upright beam of rectangular cross section, the lower end of said beam being rigidly and nonrotatably secured to said housing upper portion, certain of the sides of said beam having latticed vertical grooves formed therein resisting vertical bending and horizontal twisting of said beam; and said float having a rectangular cross section slot formed therethrough receiving said guide beam for vertical movement therebetween, said slot and beam cross sections conforming and preventing horizontal rotation of said float relative to said beam throughout said float vertical movement.

8. A ball cock as defined in claim 1 in which said housing upper portion is rigidly secured to the lower end of said guide for nonrotation therebetween; and in which a valve seat is formed on one of said housing portions, and the other of said housing portions when said housing portions are in engaged positions said valve means movable against and away from said valve seat for preventing and permitting said fluid flow, said other of said housing portions peripherally and centrally engaging said valve means to retain said positioning.

9. A ball cock as defined in claim 1 in which said guide includes an upright beam rigidly secured to one of said housing portions for nonrotation therebetween; in which said float is operably connected to said guide beam for generally vertical movement along said guide beam and nonrotation therebetween generally horizontally about said beam and throughout said float vertical movement; and in which a valve seat is formed on one of said housing portions, and the other of said housing portions positions said valve means during engagement of said housing portions movable against and away from said valve seat for preventing and permitting said fluid flow.

10. A ball cock as defined in claim 1 in which said guide includes an upright beam having the lower end thereof rigidly secured to said housing upper portion for nonrotation therebetween; in which said float is operably connected to said guide beam for generally vertical movement along said guide beam and nonrotation therebetween generally horizontally about said beam and throughout said float vertical movement; and in which a valve seat is formed on one of said housing portions, and the other of said housing portions positions said valve means during engagement of said housing portions movable against and away from said valve seat for preventing and permitting said fluid flow.

11. A ball cock as defined in claim 1 in which said guide includes an upright beam of polygonal cross section, the lower end of said beam being rigidly secured to said housing upper portion for nonrotation therebetween, certain of the sides of said beam having vertically extending lattice means formed therein for strengthening said beam to resist vertical bending and horizontal twisting; in which said float has a slot of polygonal cross section formed therethrough receiving said guide beam for vertical movement therebetween, said slot and beam cross sections conforming and preventing horizontal rotation of said float relative to said beam throughout said float vertical movement; and in which a valve seat is formed on one of said housing portions, and the other of said housing portions positions said valve means movable against and away from said valve seat for preventing and permitting said fluid flow.

12. A ball cock as defined in claim 1 in which a valve seat is formed on one of said housing portions, and the other of said housing portions positions said valve means movable against and away from said valve seat for preventing and permitting said fluid flow, said other of said housing portions peripherally and centrally engaging said valve means to retain said positioning.

13. A ball cock as defined in claim 1 in which an annular valve seat is formed on one of said housing portions; in which said valve means includes a resilient material valve seal; in which the other of said housing portions positions said valve seal through peripheral and central engagement therewith movable against and away from said valve seat for preventing and permitting said fluid flow; and in which said means moving said valve means includes means operably connected centrally of said valve seal for at least aiding in moving said valve seal against and away from said valve seat.

14. A ball cock as defined in claim 1 in which said housing lower portion includes an upwardly extending annular flange; in which said housing upper portion is received downwardly within said lower portion flange; and in which said means normally engaged between said housing portions includes radially projecting means partially on each of said housing portions for interengagement between said housing portions upon limited relative rotation between said housing portions.

15. A ball cock as defined in claim 1 in which said housing lower portion includes an annular valve seat formed on a lower internal surface of said lower portion and an upwardly extending annular peripheral flange; in which said valve means includes a resilient material valve seal maintained through peripheral and central engagement by said housing upper portion movable toward and away from said lower portion valve seat for preventing and permitting said fluid flow; in which said means operably connected to said valve means for moving said valve means includes means operably connected centrally of said valve seal for at least aiding in moving said valve seal between said positions; in which said housing upper portion is received downwardly within said lower portion flange; and in which said means normally engaged between said housing portions includes radially projecting means partially on each of said housing portions for interengagement between said housing portions upon limited relative rotation between said housing portions.

16. In a ball cock for utilization in maintaining a liquid reservoir level, the combination of: an upright beam-like guide, said guide being of a latticed groove formation resisting vertical bending and horizontal twisting; a float operably connected to said guide for vertical movement along said guide; a valve movable for controlling the flow of fluid in said tank; and means operably connected between said float and valve for moving said valve upon movement of said float.

17. A ball cock as defined in claim 16 in which said guide is of polygonal cross section, with certain sides having latticed grooves formed therein and extending vertically thereof resisting vertical bending and horizontal twisting; and in which said float is operably connected to said guide for said vertical movement through a polygonal cross section slot formed in said float vertically receiving said guide, said guide and float slot cross sections conforming and preventing rotation between said guide and float throughout said float vertical movement.

18. A ball cock as defined in claim 16 in which said guide is of rectangular cross section, opposite sides of said guide being formed with latticed grooves therein and extending vertically thereof resisting vertical bending and horizontal twisting; and in which said float is operably connected to said guide through a rectangular cross section slot formed through said float and telescopically receiving said guide for said vertical movement of said float on said guide, said guide and float slot cross sections conforming and preventing rotation between said guide and float throughout said float vertical movement.

19. A ball cock as defined in claim 16 in which said guide is of rectangular cross section, opposite sides of said guide being formed with latticed grooves therein and extending vertically thereof resisting vertical bending and horizontal twisting; in which said float is operably connected to said guide through a rectangular cross section slot formed through said float and telescopically receiving said guide for said vertical movement of said float on said guide, said guide and float slot cross sections conforming and preventing rotation between said guide and float throughout said float vertical movement; and in which said guide is formed of a plastic material.

20. A ball cock as defined in claim 16 in which said guide is of rectangular cross section, opposite sides of said guide being formed with latticed grooves therein and extending vertically thereof resisting vertical bending and horizontal twisting; in which said float is operably connected to said guide through a rectangular cross section slot formed through said float and telescopically receiving said guide for said vertical movement of said float on said guide, said guide and float slot cross sections conforming and preventing rotation between said guide and float throughout said float vertical movement.

21. In a ball cock for utilization in maintaining a liquid reservoir level, the combination of: an upright beam-like guide; means rigidly connected to said guide for normally remaining in a connected condition and being selectively disconnectable upon horizontal rotation of said guide; a float having a slot formed therethrough, said float receiving said guide in said float slot for vertical movement of said float along said guide; means formed partially on said guide and partially on said float within said float slot co-operating for preventing relative rotation between said guide and float throughout said float vertical movement while permitting said float vertical movement along said guide; valve means movable for controlling the flow of fluid in said tank; and means operably connected between said float and valve means for moving said valve means upon vertical movement of said float along said guide.

22. A ball cock as defined in claim 21 in which said guide and float are formed of plastic materials; and in which said guide is of a latticed-groove formation resisting vertical bending and horizontal twisting.

23. A ball cock as defined in claim 21 in which said guide and said float are formed of plastic materials; in which said guide includes an upright polygonal cross section beam, certain sides of said beam having latticed grooves formed vertically therein resisting vertical bending and horizontal twisting; in which said float groove is of polygonal cross section; and in which said means co-operating between said guide and float includes certain portions of sides of said guide beam vertically slidably engaged with certain portions of said float adjacent said float slot, said beam sides certain portions and said float certain portions co-operating to prevent said relative rotation between said beam and float.

References Cited

UNITED STATES PATENTS 2,586,619 2/1952 Davis _____ 73—322.5
3,254,665 6/1966 Bachli et al. _____ 137—414

ALAN COHAN, *Primary Examiner.*

D. R. MATTHEWS, *Assistant Examiner.*

U.S. Cl. X.R.

137—414, 430; 251—367; 285—376